UNITED STATES PATENT OFFICE.

JOHN KIMMEL AND JOHN SCHMIDGRUBER, OF BOSTON, MASSACHUSETTS.

IMPROVEMENT IN PROCESSES OF TREATING TOBACCO-LEAVES.

Specification forming part of Letters Patent No. 194,247, dated August 14, 1877; application filed April 4, 1877.

*To all whom it may concern:*

Be it known that we, JOHN KIMMEL and JOHN SCHMIDGRUBER, both of Boston, in the county of Suffolk and State of Massachusetts, have invented a new and useful Process for Treating Tobacco-Leaves, which process is fully set forth in the following specification:

Our invention relates to a process of preparing tobacco-leaves to render them more desirable, both in respect to appearance and flavor, for wrappers of cigars, &c.; and it consists in treating the leaves with a mixture of logwood, cochineal, and wine or cider, prepared and applied in the manner hereinafter described.

We first carefully compound the mixture consisting of logwood, cochineal, and wine or cider, in about the following proportions: sixteen ounces of logwood, one ounce of cochineal, three gallons of wine or cider. Wine is preferable to cider, giving a better flavor. The wine should be of a kind—as, for instance, hock—and the cider of the proper age to have a suitable degree of acidity. After these ingredients have been thoroughly mixed the mixture is boiled for about three minutes, and thereupon poured into a glass or stone vessel, where it is allowed to cool. When cold the mixture is strained.

We apply the mixture thus prepared to the leaves of tobacco by wetting the right side of the leaves—that is, the outer side, as they are used as wrappers for cigars—by any convenient means, as by the use of a brush. The leaves are then thoroughly pressed, being allowed to remain in the press a sufficient length of time—say twelve hours—to cause them to be well impregnated with the mixture. When removed from the press the leaves are right for use as wrappers for cigars, &c.

Tobacco-leaves objectionable on account of their being of a light or mixed color, after being treated by our process, will be of an even, bright, dark-brown color, which will not change with age.

Any tobacco-leaf, however tender, may be treated by our process without injury.

The natural taste and smell of tobacco thus treated are not only not injured, but the flavor is greatly improved.

Thus, by our process, we are able to enhance the value of tobacco-leaves in respect to color, evenness, and durability of color and flavor.

We claim as our invention—

The process of treating tobacco-leaves with a mixture of logwood, cochineal, and wine or cider, prepared and applied substantially as hereinbefore set forth.

JOHN KIMMEL.
JOHN SCHMIDGRUBER.

Witnesses:
EDW. DUMMER,
H. E. BATHRICK.